United States Patent
Benhase et al.

(10) Patent No.: US 9,043,544 B2
(45) Date of Patent: *May 26, 2015

(54) WRITING OF NEW DATA OF A FIRST BLOCK SIZE IN A RAID ARRAY THAT STORES BOTH PARITY AND DATA IN A SECOND BLOCK SIZE

(75) Inventors: Michael T. Benhase, Tucscon, AZ (US); Ian D. Judd, Hampshire (GB); Daniel F. Moertl, Rochester, MN (US); Karl A. Nielsen, Tucscon, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/460,493

(22) Filed: Apr. 30, 2012

(65) Prior Publication Data
US 2012/0303892 A1 Nov. 29, 2012

Related U.S. Application Data

(63) Continuation of application No. 13/113,546, filed on May 23, 2011.

(51) Int. Cl.
G06F 12/00 (2006.01)
G06F 3/06 (2006.01)
G06F 11/20 (2006.01)
(Continued)

(52) U.S. Cl.
CPC ............ *G06F 3/061* (2013.01); *G06F 11/2089* (2013.01); *G11B 2020/1222* (2013.01); *G11B 2220/415* (2013.01); *G06F 2211/1059* (2013.01); *G06F 2211/1057* (2013.01);
(Continued)

(58) Field of Classification Search
CPC ..... G06F 12/00; G06F 12/0146; G06F 3/064; G06F 3/061; G06F 3/0689; G06F 3/0679; G06F 11/1076; G06F 11/2089; G06F 2211/1059; G06F 2211/1009; G06F 2212/2022; G06F 2212/262
USPC .......................................... 711/114
See application file for complete search history.

(56) References Cited

U.S. PATENT DOCUMENTS 5,206,939 A * 4/1993 Yanai et al. ...................... 711/4
7,080,200 B2 * 7/2006 Hassner et al. ............... 711/114
(Continued)

OTHER PUBLICATIONS

Office Action dated Jun. 28, 2013, pp. 28, for U.S. Appl. No. 13/463,122, filed May 3, 2012 by inventors M.T. Benhase, et al.
(Continued)

*Primary Examiner* — Reginald Bragdon
*Assistant Examiner* — Hannah A Faye-Joyner
(74) *Attorney, Agent, or Firm* — Rabindranath Dutta; Konrad Raynes Davda & Victor LLP

(57) ABSTRACT

A Redundant Array of Independent Disks (RAID) controller receives new data that is to be written, wherein the new data is indicated in blocks of a first block size. The RAID controller reads old data, and old parity that corresponds to the old data, stored in blocks of a second block size that is larger in size than the first block size. The RAID controller computes new parity based on the new data, the old data, and the old parity. The RAID controller writes the new data and the new parity aligned to the blocks of the second block size, wherein portions of the old data that are not overwritten by the RAID controller are also written to the blocks of the second block size.

18 Claims, 10 Drawing Sheets

(51) Int. Cl.
*G11B 20/12* (2006.01)
*G06F 11/10* (2006.01)

(52) U.S. Cl.
CPC .......... *G06F11/1076* (2013.01); *G06F 3/0638* (2013.01); *G06F 3/0661* (2013.01); *G06F 3/0689* (2013.01)

(56) References Cited

U.S. PATENT DOCUMENTS

| | | | |
|---|---|---|---|
| 7,827,434 | B2 | 11/2010 | D'Souza et al. |
| 8,112,663 | B2 * | 2/2012 | S et al. .................. 714/6.24 |
| 8,255,661 | B2 | 8/2012 | Karr et al. |
| 8,291,190 | B2 * | 10/2012 | Watanabe et al. ............. 711/172 |
| 8,407,446 | B2 * | 3/2013 | Forrer et al. .................. 711/171 |
| 2005/0036381 | A1 | 2/2005 | Hassner et al. |
| 2005/0071557 | A1 | 3/2005 | Kawamura et al. |
| 2006/0123268 | A1 * | 6/2006 | Forhan et al. ..................... 714/6 |
| 2009/0006725 | A1 | 1/2009 | Ito et al. |
| 2009/0063768 | A1 | 3/2009 | Kalos et al. |
| 2009/0259924 | A1 | 10/2009 | Amann et al. |
| 2009/0300466 | A1 * | 12/2009 | Yoshimura ................... 714/769 |
| 2010/0199053 | A1 | 8/2010 | Otani et al. |
| 2011/0119464 | A1 * | 5/2011 | Karr et al. ..................... 711/171 |

OTHER PUBLICATIONS

Response dated Dec. 11, 2012, pp. 1-2, to UK Combined Search and Examination Report dated Aug. 24, 2012 for Application No. GB1208691.4 filed May 17, 2012.
German Office Action dated Feb. 21, 2013, pp. 1-5, for Application No. 102012103655.1 filed Apr. 26, 2012.
Information Materials document dated Feb. 26, 2013 for German Application Serial No. 10 2012 103 655.1.
Response dated Sep. 30, 2013, pp. 11, to Office Action dated Jun. 28, 2013, pp. 28, for U.S. Appl. No. 13/463,122, filed May 3, 2012 by inventors M.T. Benhase, et al.
Response dated Oct. 1, 2013, pp. 15, to Office Action dated Jul. 1, 2013, pp. 29, for U.S. Appl. No. 13/113,562, filed May 23, 2011 by inventors M.T. Benhase, et al.
Preliminary Amendment 1, Jul. 21, 2011, for U.S. Appl. No. 13/113,562, filed May 23, 2011 by M.T. Benhase et al., Total 13 pp.
Preliminary Amendment 2, May 3, 2012, for U.S. Appl. No. 13/113,562, filed May 23, 2011 by M.T. Benhase et al., Total 7 pp.
Preliminary Amendment, May 3, 2012, for U.S. Appl. No. 13/463,122, filed May 3, 2012 by M.T. Benhase et al., Total 19 pp.
U.S. Appl. No. 13/463,122, filed May 3, 2012, entitled "Writing of Data of a First Block Size in a Raid Array that Stores and Mirrors Data in a Second Block Size" invented by Benhase, M.T., A. Akihiro, and M. Sugiura, Total 36 pp.
U.S. Appl. No. 13/113,562, filed May 23, 2011, entitled "Writing of Data of a First Block Size in a Raid Array that Stores and Mirrors Data in a Second Block Size", invented by Benhase, M.T., A. Akihiro, and M. Sugiura, Total 36 pp.
Preliminary Amendment 1, Jul. 21, 2011, for U.S. Appl. No. 13/113,546, filed May 23, 2011 by Benhase et al., Total 13 pp.
Preliminary Amendment 2, Apr. 30, 2012, for U.S. Appl. No. 13/113,546, filed May 23, 2011 by Benhase et al. Total 8 pp.
U.S. Appl. No. 13/113,546 entitled "Writing of New Data of a First Block Size in a Raid Array that Stores Both Parity and Data in a Second Block Size", filed May 23, 2011 by inventors Benhase, M.T., I.D. Judd, D. F. Moerti, and K.A. Nielsen, Total 39 pp.
UK Combined Search and Examination Report dated Aug. 24, 2012 for Application No. GB1208691.4 filed May 17, 2012.
Response dated Jan. 16, 2014, pp. 15, to Office Action dated Oct. 16, 2013, pp. 47 for U.S. Appl. No. 13/113,546, filed May 23, 2011.
Office Action dated Dec. 24, 2013, pp. 23, for U.S. Appl. No. 13/113,562, filed May 23, 2011.
Office Action dated Oct. 16, 2013, pp. 47 for U.S. Appl. No. 13/113,546, filed May 23, 2011.
Final Office Action dated Nov. 8, 2013, pp. 21, for U.S. Appl. No. 13/463,122, filed May 3, 2012.
Response dated Feb. 10, 2014, pp. 9, to Final Office Action dated Nov. 8, 2013, pp. 21, for U.S. Appl. No. 13/463,122, filed May 3, 2012.
Office Action dated Feb. 27, 2014, pp. 19, for U.S. Appl. No. 13/463,122, filed May 3, 2012.
Final Office Action dated Mar. 28, 2014, pp. 30 for U.S. Appl. No. 13/113,546, filed May 23, 2011.
Response dated Jun. 30, 2014, pp. 15, to Final Office Action dated Mar. 28, 2014, pp. 30 for U.S. Appl. No. 13/113,546, filed May 23, 2011.
Supplemental Amendment filed Apr. 18, 2014, pp. 11 for U.S. Appl. No. 13/113,562, filed May 23, 2011.
Response dated May 27, 2014, pp. 10, to Office Action dated Feb. 27, 2014, pp. 19, for U.S. Appl. No. 13/463,122, filed May 3, 2012.
Notice of Allowance dated Jun. 4, 2014, pp, 20, for U.S. Appl. No. 13/113,562, filed May 23, 2011.
Notice of Allowance dated Jun. 4, 2014, pp, 15, for U.S. Appl. No. 13/463,122, filed May 3, 2012.
Response dated Mar. 24, 2014, pp. 11, to Office Action dated 2013-1224, pp. 23, for U.S. Appl. No. 13/113,562, filed May 23, 2011.
Notice of Allowance dated Sep. 22, 2014, pp. 8, U.S. Appl. No. 13/463,122, filed May 3, 2012.
Notice of Allowance dated Sep. 23, 2014, pp. 13, U.S. Appl. No. 13/113,562, filed May 23, 2011.
Response dated Nov. 17, 2014, pp. 17, to Office Action dated Aug. 15, 2014, pp. 26 for U.S. Appl. No. 13/113,546, filed May 23, 2011.
Office Action dated Aug. 15, 2014, pp. 26 for U.S. Appl. No. 13/113,546, filed May 23, 2011.
Supplemental Amendment filed Jul. 29, 2014, pp. 13, Final Office Action dated Mar. 28, 2014, pp. 30 for U.S. Appl. No. 13/113,546, filed May 23, 2011.
Notice of Allowance dated Jan. 20, 2015, pp. 26, for U.S. Appl. No. 13/113,546, filed May 23, 2011.

* cited by examiner

WRITING OF NEW DATA OF A FIRST BLOCK SIZE IN A RAID ARRAY THAT STORES BOTH PARITY AND DATA IN A SECOND BLOCK SIZE

CROSS-REFERENCE TO RELATED APPLICATION

This application is a continuation of U.S. application Ser. No. 13/113,546, filed May 23, 2011, which application is incorporated herein by reference in its entirety.

BACKGROUND

1. Field

The disclosure relates to a method, system, and article of manufacture for the writing of new data of a first block size in a Redundant Array of Independent Disks (RAID) array that stores both parity and data in a second block size.

2. Background

Redundant Array of Independent Disks (RAID) is a category of disk drives that combine two or more disk drives to provide fault tolerance for data. RAID allows for the redundant storage of the same data across a plurality of disks. In certain configurations of RAID, such as RAID-5 or RAID-6, parity information may also be stored to recover from a failure of one or more disks. The physical disks of a RAID may be said to be in a RAID array that may be addressed by an operating system as one single disk. Data may be written in stripes in a RAID array, wherein data striping is the spreading out of blocks of each file across a plurality of disk drives.

A sector is a specifically sized division of a disk. Previously, one sector of a disk was generally configured to hold 512 bytes of information. However, recently certain disks are being configured to hold 4096 bytes (i.e., 4 Kilobyte) of information by disk manufacturers.

A block is a group of sectors of a disk that an operating system can address. Count-key-data (CKD) is a disk data organization model of certain operating systems in which the disk is assumed to be comprised of a fixed number of tracks, each having a maximum data capacity. Multiple records of varying length may be written on each track of a CKD disk, and the usable capacity of each track depends on the number of records written to the track. CKD architecture derives its name from the record format, which comprises a field containing the number of bytes of data and a record address, an optional key field, and the data itself. CKD records are stored in 512 byte blocks.

SUMMARY OF THE PREFERRED EMBODIMENTS

Provided are a method, a system, and a computer program product in which a Redundant Array of Independent Disks (RAID) controller receives new data that is to be written, wherein the new data is indicated in blocks of a first block size. The RAID controller reads old data, and old parity that corresponds to the old data, stored in blocks of a second block size that is larger in size than the first block size. The RAID controller computes new parity based on the new data, the old data, and the old parity. The RAID controller writes the new data and the new parity aligned to the blocks of the second block size, wherein portions of the old data that are not overwritten by the RAID controller are also written to the blocks of the second block size.

In further embodiments, the RAID controller is implemented in hardware, and the RAID controller controls disks that are configured as RAID-5. The reading is performed via two sets of read operations from the disks, wherein a first set of read operations include reading the old data and a second set of read operations include reading the old parity. The writing is performed via two sets of write operations to the disks, wherein a first set of write operations include writing the new data and portions of the old data that are not overwritten, and a second set of write operations include writing the new parity.

In yet further embodiments, the RAID controller controls disks that are configured as RAID-6, wherein the old parity comprises a first set of old parity and a second set of old parity, and wherein the new parity comprises a first set of new parity and a second set of new parity. The reading is performed via three sets of read operations from the disks, wherein a first set of read operations include reading the old data, a second set of read operations include reading the first set of old parity, and a third set of read operations include reading the second set of old parity. The writing is performed via three sets of write operations to the disks, wherein a first set of write operations include writing the new data and portions of the old data that are not overwritten, a second set of write operations include writing the first set of new parity, and a third set of write operations include writing the second set of new parity.

In further embodiments, the first block size is 512 bytes, and the second block size is 4 Kilobytes (also referred to as 4K instead of 4 Kilobytes). The new data is received by the RAID controller from a host whose operating system is configured to access the blocks of the first block size of 512 bytes, wherein the blocks of the first block size of 512 bytes store control key data (CKD) CKD records, wherein each CKD record is aligned to a 512 byte block boundary.

In additional embodiments, the new data comprises a first plurality of blocks of the first block size. The first plurality of blocks of the first block size are stored adjacently within at least one of a second plurality of blocks of the second block size. Each of the first plurality of blocks is stored entirely within at most one of the second plurality of blocks.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Mapping Data of 512 Byte Block Size into 4 Kilobyte Blocks

Physical disks were previously configured into 512 byte sectors by disk manufacturers. Recently physical disks that are configured into 4 Kilobyte sectors have become available. However, certain disk data organization models such as CKD rely on operating system accesses via 512 byte blocks even when physical disks that are configured onto 4 Kilobyte blocks are used.

Certain embodiments provide a RAID controller that maps operating system requests to write new 512 byte blocks into a RAID configuration that stores old data and old parity in 4 Kilobyte blocks. A plurality of new 512 byte blocks may be written adjacent to each other and the block boundaries of the new 512 byte blocks are aligned with the block boundaries of one or more 4 Kilobyte blocks. The RAID controller preserves the old information that is not overwritten by the writing of the new 512 bytes blocks in the 4 Kilobyte blocks, by rewriting the old information. Extra operations that indicate to the operating system that the RAID configuration does not natively support 512 byte blocks do not have to be performed by the RAID controller.

Exemplary Embodiments

Figure 1:
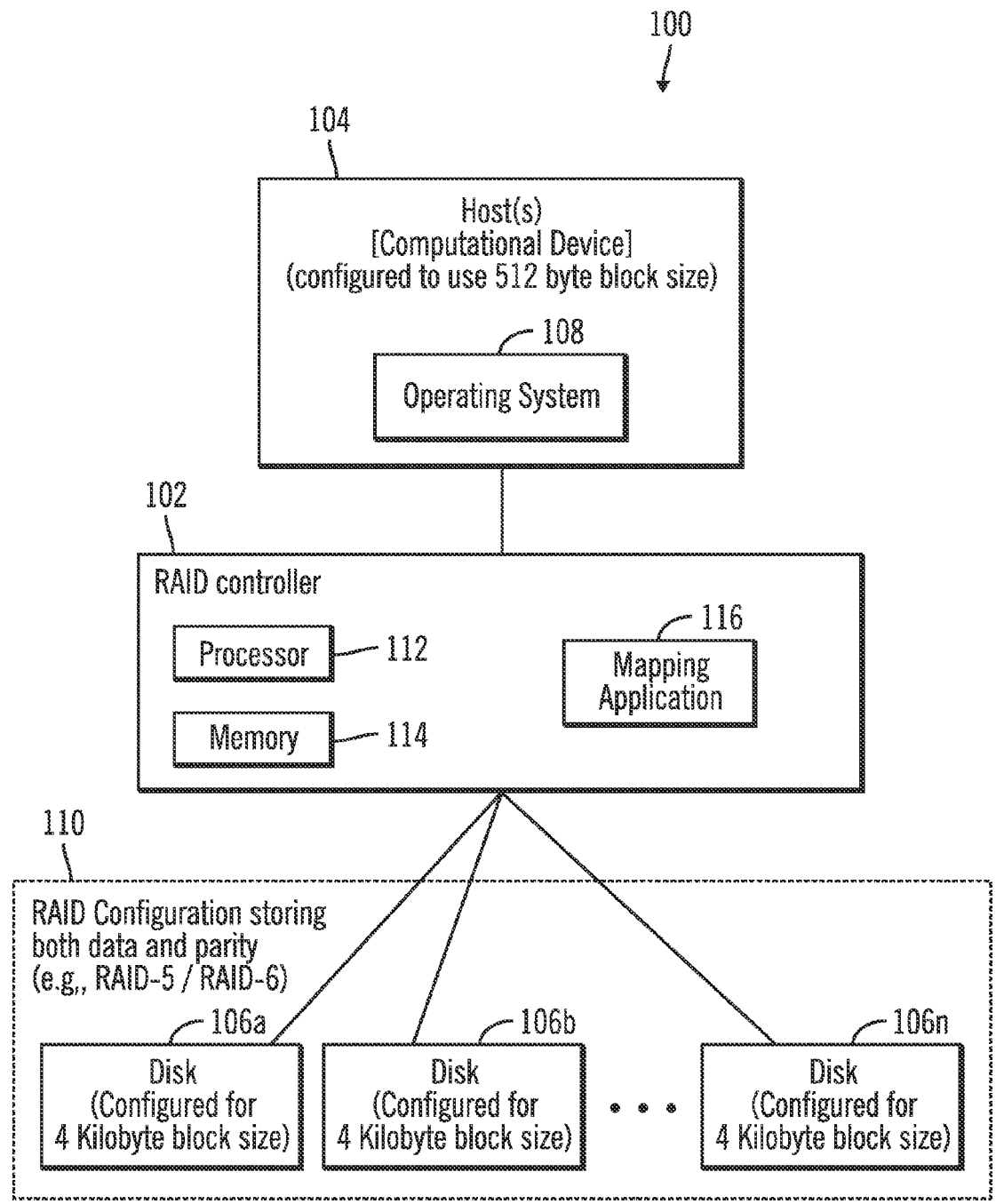
FIG. 1 illustrates a block diagram of a computing environment that includes a RAID controller coupled to a host and a plurality of disks, in accordance with certain embodiments.

FIG. 1 illustrates a block diagram of a computing environment 100 that includes a RAID controller 102 coupled to one or more hosts 104 and a plurality of disks 106a, 106b, . . . , 106n, in accordance with certain embodiments.

The RAID controller 102 and the hosts 104 may comprise any suitable computational device including those presently known in the art, such as, a personal computer, a workstation, a server, a mainframe, a hand held computer, a palm top computer, a telephony device, a network appliance, a blade computer, a server, etc. The plurality of disks 106a . . . 106n may comprise any suitable physical hard disks known in the art. In alternative embodiments, the plurality of disks 106a . . . 106n may comprise other types of disks such as solid state disks, optical disks, etc.

The host 104 may include an operating system 108 that is configured to use a 512 byte block size for accessing blocks. The plurality of disks 106a . . . 106n may be configured in any RAID configuration 110 that stores both parity and data, such as RAID-5 or RAID-6, wherein RAID-5 uses block-level striping with parity data distributed across all member disks, and RAID-6 uses block-level striping with two parity blocks distributed across all member disks. Each of the plurality of disks 106a . . . 106n is configured for a 4 Kilobyte block size. Therefore, in embodiments shown in FIG. 1, the plurality of disks 106a . . . 106n of the RAID configuration 110 are configured for a 4 Kilobyte block size whereas the host 104 is configured to use a 512 byte block size.

The RAID controller 102 includes a processor 112, a memory 114, and a mapping application 116. The mapping application 116 may be implemented in hardware, software, firmware or any combination thereof. The mapping application 116 interprets input/output (I/O) requests for 512 byte blocks from the host 104 and maps such requests to read and write data with respect to the disks 106a . . . 106n in the RAID configuration 110. The reads and writes performed via the RAID controller 102 with respect to the disks 106a . . . 106n are all in multiples of 4 Kilobytes in size, as the plurality of disks 106a . . . 106n of the RAID configuration 110 are configured for a 4 Kilobyte block size. The host 104 does not have to be informed by the RAID controller 102 as to whether or not the RAID configuration 110 supports the 512 byte block size used by the operating system 108 of the host 104.

Figure 2:
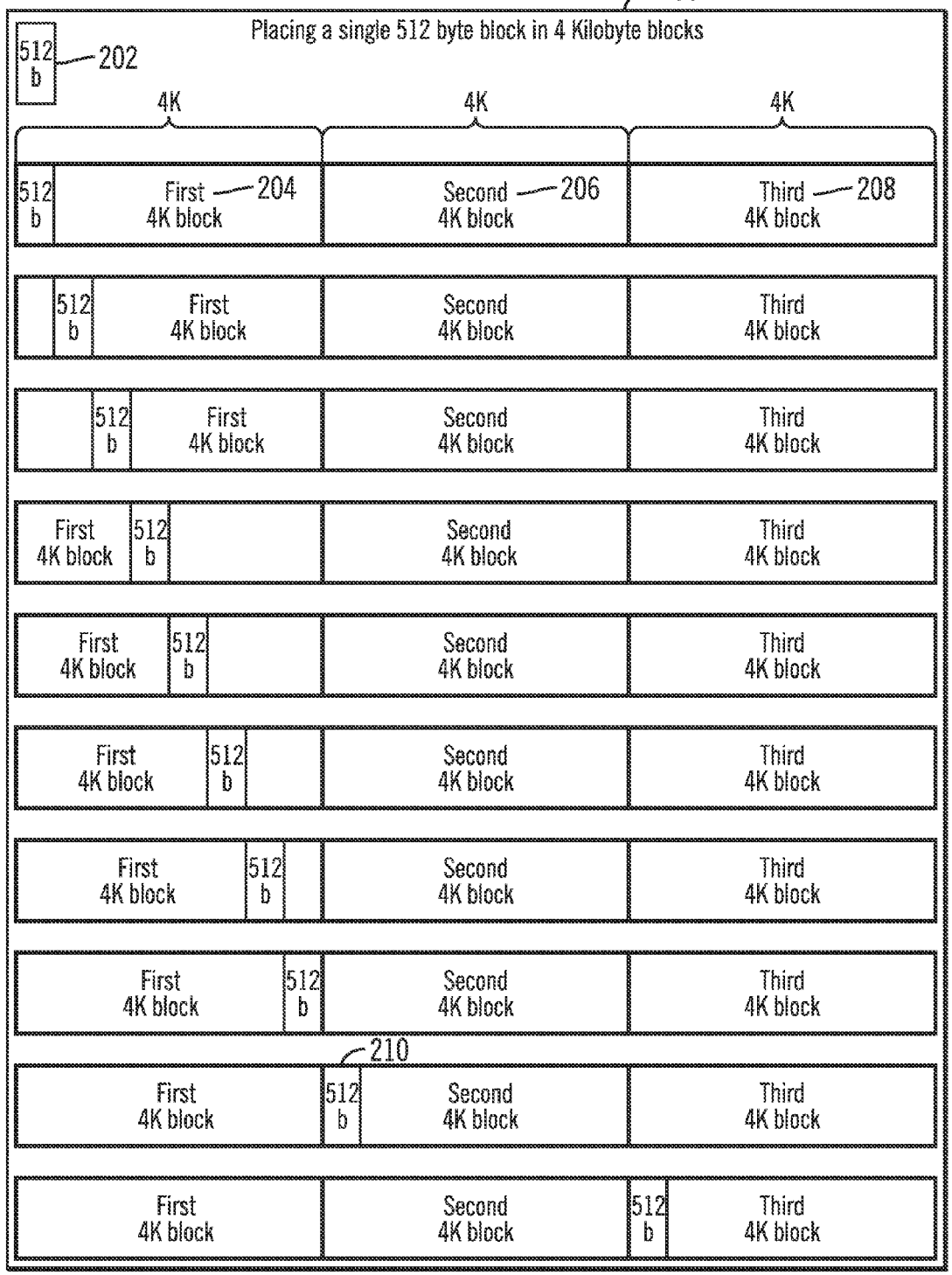
FIG. 2 illustrates a block diagram that shows how a single 512 byte block is placed in 4 Kilobyte blocks, in accordance with certain embodiments.

FIG. 2 illustrates a block diagram 200 that shows how a single 512 byte block is placed in 4 Kilobyte blocks, in accordance with certain embodiments. For example, in certain embodiments, the RAID controller 102 receives a request from the operating system 108 of the host 104 to write a single 512 byte block 202 to the RAID configuration 110. In response to receiving the request, the RAID controller 102 may read any of the three 4 Kilobyte blocks, i.e., first 4K block 204, second 4K block 206, third 4K block 208 or any other 4 Kilobyte block from the RAID configuration 110, then modify data and parity, and then write the 512 byte block 202 in any of the 4 Kilobyte blocks 204, 206, 208 as shown in FIG. 2. It should be noted that old data may have existed in the 4 Kilobyte block on which the 512 byte block 202 having new data is being written. Some portions of the old data or other information may be overwritten by the writing of the 512 byte block 202. However, other portions of the old data or other information (that are not overwritten by the writing of the 512 byte block 202) are rewritten to the remaining portions of the 4 Kilobyte block as reads and writes with respect to the RAID disks 106a . . . 106n take place in multiples of 4 Kilobyte blocks. For example, in the configuration shown via reference numeral 210, the 512 byte block has been written in the second 4 Kilobyte block and unmodified portions of existing data or information on the second 4 Kilobyte block are written once again. It can be observed that a single 4 Kilobyte block can accommodate at least a single 512 byte block.

Figure 3:
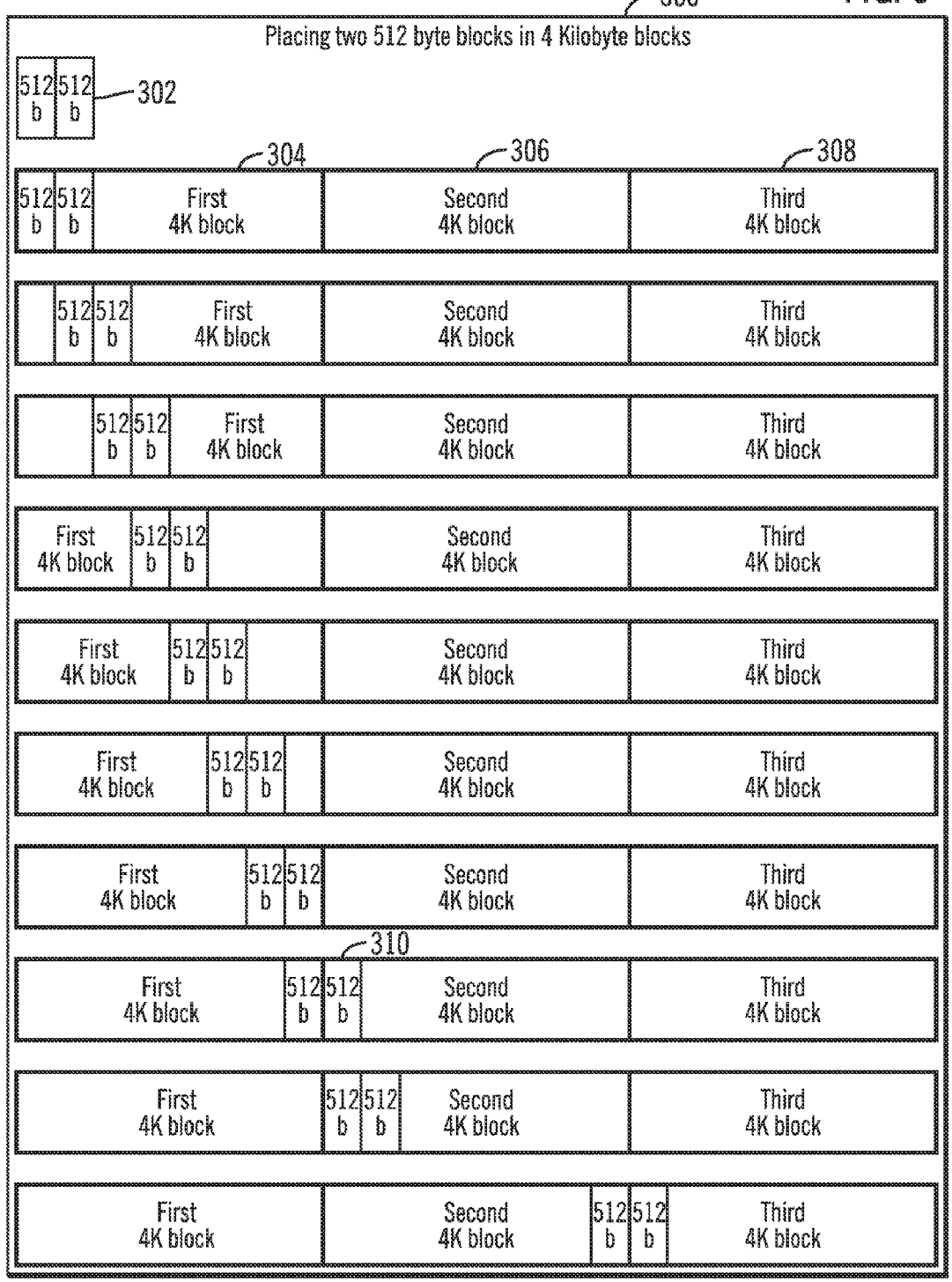
FIG. 3 illustrates a block diagram that shows how two 512 byte blocks are placed in 4 Kilobyte blocks, in accordance with certain embodiments.

FIG. 3 illustrates a block diagram 300 that shows how two 512 byte blocks are placed in 4 Kilobyte blocks, in accordance with certain embodiments. For example, in certain embodiments, the RAID controller 102 receives a request from the operating system 108 of the host 104 to write two 512 byte blocks 302 to the RAID configuration 110. In response to receiving the request, the RAID controller 102 may read one or two adjacent blocks of the three 4 Kilobyte blocks, i.e., first 4K block 304, second 4K block 306, third 4K block 308, from the RAID configuration 110, then modify data and parity, and then write the two 512 byte blocks 302 in at least one and no more than two of the 4 Kilobyte blocks 304, 306, 308 as shown in FIG. 3. It should be noted that old data may have existed in the at least one and no more than two of the 4 Kilobyte blocks on which the two 512 byte blocks 302 having new data are being written. Some portions of the old data or other information may be overwritten by the writing of the two 512 byte blocks 302. However, other portions of the old data or other information (that are not overwritten by the writing of the two 512 byte blocks 302) are rewritten to the remaining portions of the at least one and no more than two 4 Kilobyte blocks, as reads and writes with respect to the RAID disks 106a . . . 106n take place in multiples of 4 Kilobyte blocks. For example, in the configuration shown via reference numeral 310, the two 512 byte blocks have been written adjacently in the first and second 4 Kilobyte blocks and unmodified portions of existing data or information on the first and second 4 Kilobyte blocks are written once again. It can be observed that at least one and no more than two 4 Kilobyte blocks can accommodate two 512 byte blocks, wherein the two 512 byte blocks are stored adjacently and aligned with the 4 Kilobyte blocks.

Figure 4:
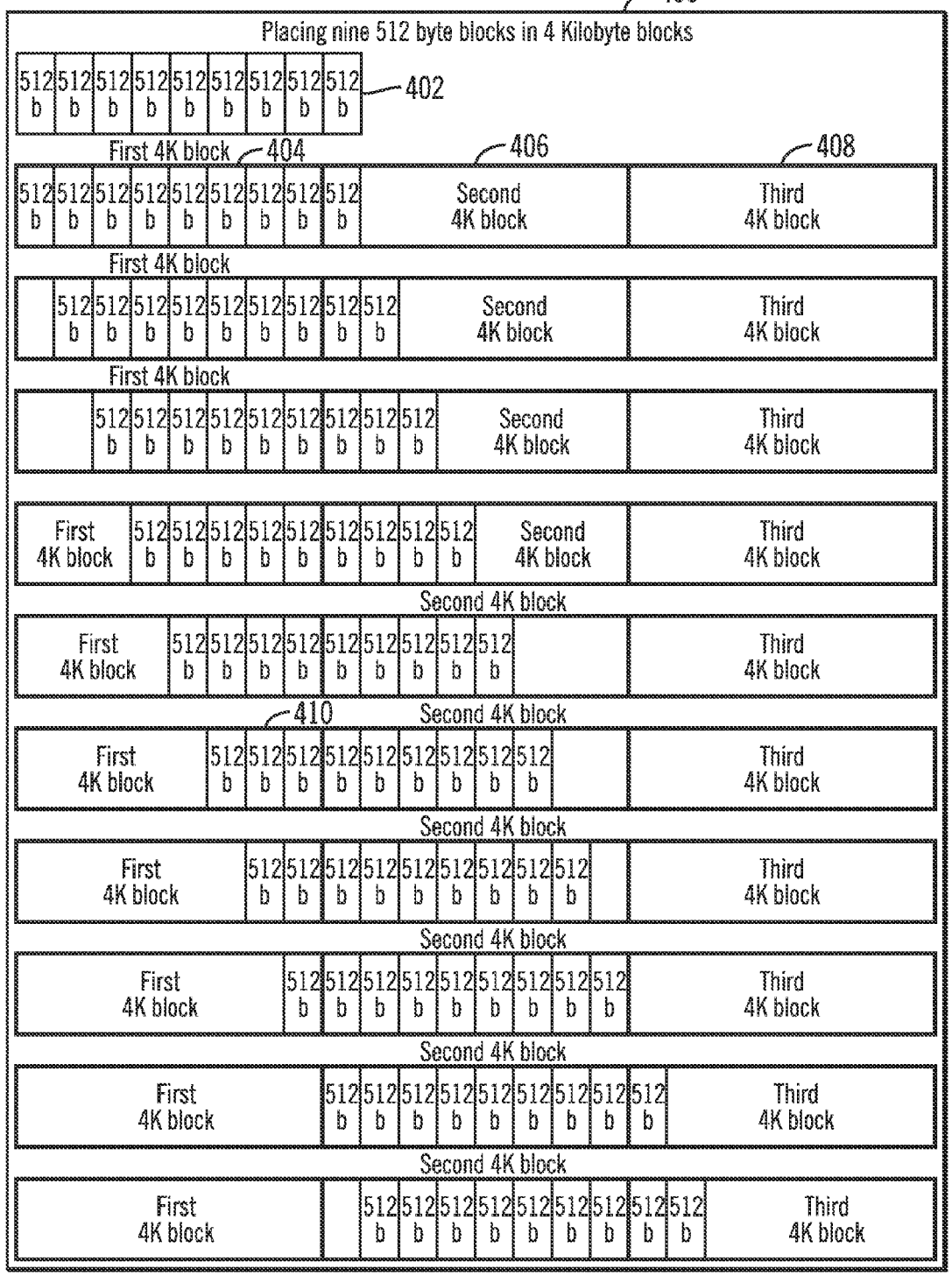
FIG. 4 illustrates a block diagram that shows how nine 512 byte blocks are placed in 4 Kilobyte blocks, in accordance with certain embodiments.

FIG. 4 illustrates a block diagram 400 that shows how nine 512 byte blocks are placed in 4 Kilobyte blocks, in accordance with certain embodiments. For example, in certain embodiments, the RAID controller 102 receives a request from the operating system 108 of the host 104 to write nine 512 byte blocks 402 to the RAID configuration 110. In response to receiving the request, the RAID controller 102 may read any two adjacent 4 Kilobyte blocks selected from the three 4 Kilobyte blocks 404, 406, 408 from the RAID configuration 110, then modify data and parity, and then write the nine 512 byte blocks 402 in two adjacent 4 Kilobyte blocks as shown in FIG. 4. It should be noted that old data may have existed in the two adjacent 4 Kilobyte blocks on which the nine 512 byte blocks 402 having new data are being written. Some portions of the old data or other information may be overwritten by the writing of nine 512 byte blocks 402. However, other portions of the old data or other information (that are not overwritten by the writing of the nine 512 byte blocks 402) are rewritten to the remaining portions of the two adjacent 4 Kilobyte blocks, as reads and writes with respect to the RAID disks 106a . . . 106n take place in multiples of 4 Kilobyte blocks. For example, in the configuration shown via reference numeral 410 the nine 512 byte blocks have been written adjacently in the first and second 4 Kilobyte blocks and unmodified portions of existing data or information on the first and second 4 Kilobyte blocks are written once again. It can be observed that two 4 Kilobyte blocks can accommodate nine 512 byte blocks, wherein the nine 512 byte blocks are stored adjacently and aligned with the 4 Kilobyte blocks. Alignment of blocks mean that a single 512 byte block is not distributed in multiple 4K blocks, and eight 512 byte blocks can be accommodated in a single 4 Kilobyte blocks, i.e., the starting location of a 512 byte block within a 4 Kilobyte block is at intervals of 512 bytes starting from the beginning of the 4 Kilobyte block.

Figure 5:
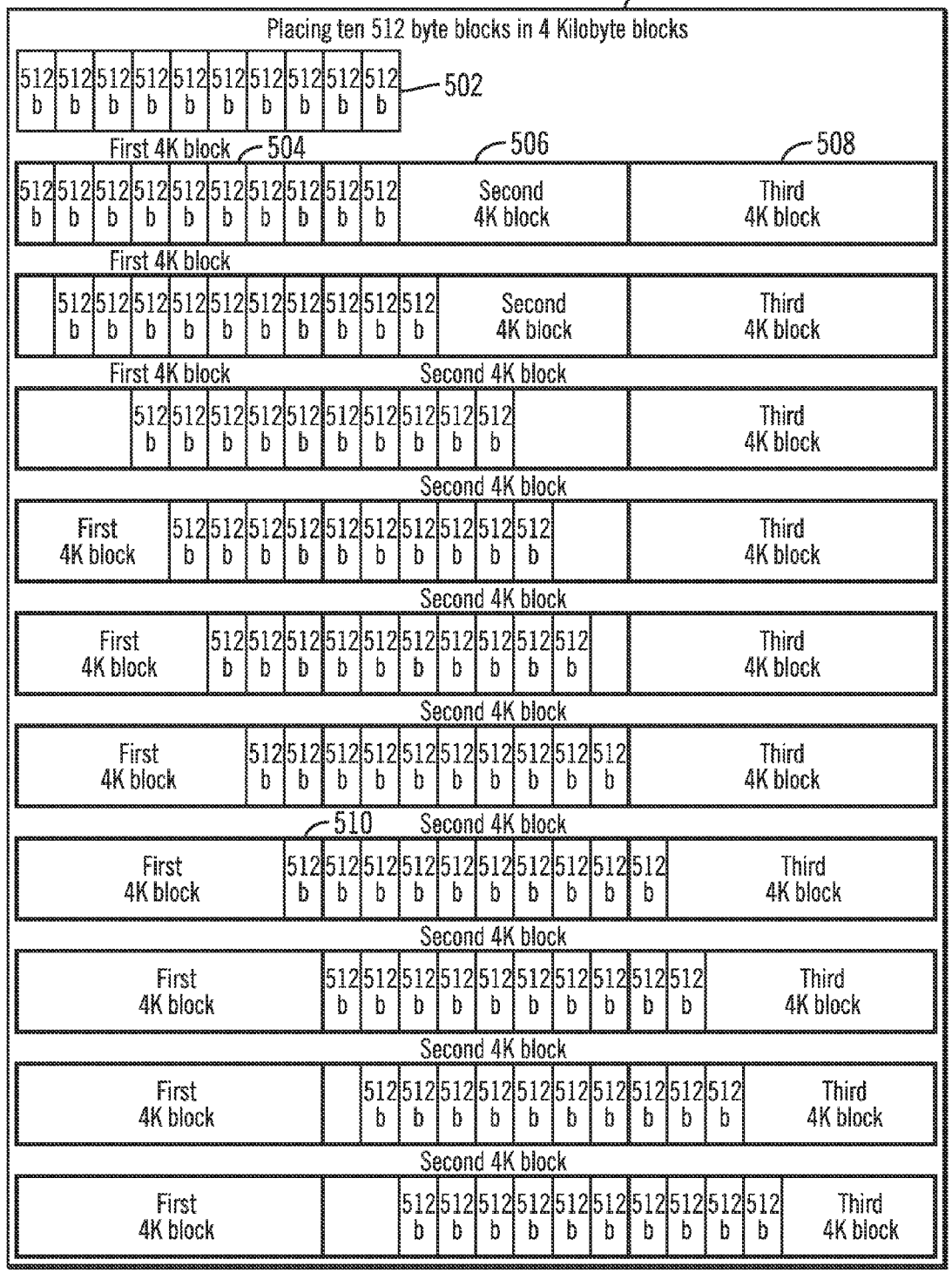
FIG. 5 illustrates a block diagram that shows how ten 512 byte blocks are placed in 4 Kilobyte blocks, in accordance with certain embodiments.

FIG. 5 illustrates a block diagram 500 that shows how ten 512 byte blocks are placed in 4 Kilobyte blocks, in accordance with certain embodiments. For example, in certain embodiments, the RAID controller 102 receives a request from the operating system 108 of the host 104 to write ten 512 byte blocks 502 to the RAID configuration 110. In response to receiving the request, the RAID controller 102 may read two or three adjacent 4 kilobyte blocks selected from the three 4 Kilobyte blocks 404, 406, 408 from the RAID configuration 110, then modify data and parity, and then write the ten 512 byte blocks 402 in at least two and no more than three adjacent 4 Kilobyte blocks as shown in FIG. 5. It should be noted that old data may have existed in the two and no more than three adjacent 4 Kilobyte blocks on which the ten 512 byte blocks 502 having new data are being written. Some portions of the old data or other information may be overwritten by the writing of the ten 512 byte blocks 502. However, other portions of the old data or other information (that are not overwritten by the writing of the ten 512 byte block 502) are rewritten to the remaining portions of the at least two and no more than three adjacent 4 Kilobyte blocks, as reads and writes with respect to the RAID disks 106a . . . 106n take place in multiples of 4 Kilobyte blocks. For example, in the configuration shown via reference numeral 510 the ten 512 byte blocks have been written adjacently in the first, second and third 4 Kilobyte blocks and unmodified portions of existing data or information on the first, second, and third 4 Kilobyte blocks are written once again. It can be observed that at least two and no more than three 4K blocks can accommodate ten 512 byte blocks, wherein the 512 byte blocks are stored adjacently and aligned with the 4 Kilobyte blocks.

Figure 6:
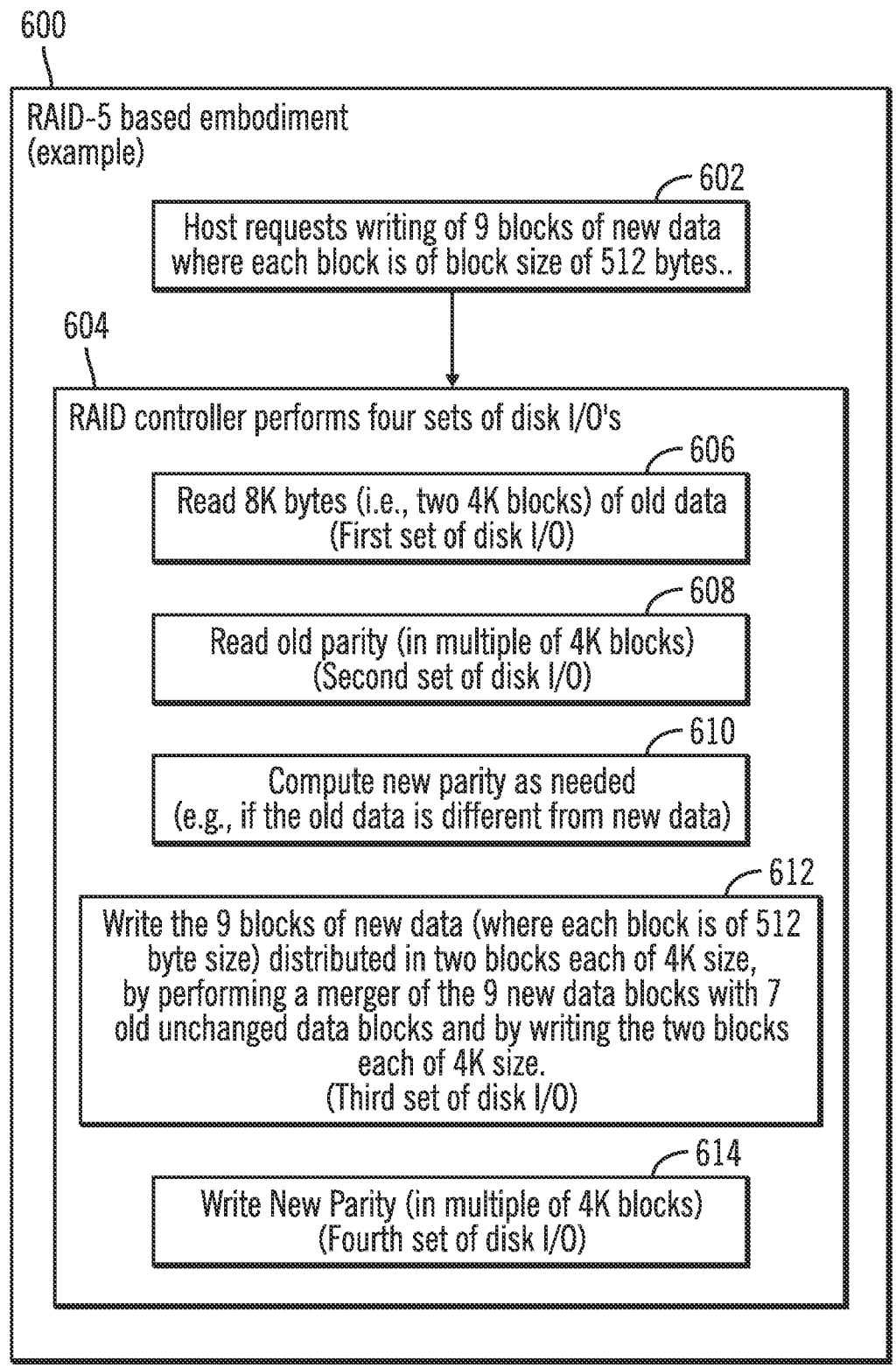
FIG. 6 illustrates a block diagram that shows certain disk I/O operations performed by the RAID controller controlling a RAID-5 configuration, in accordance with certain embodiments.

FIG. 6 illustrates a block diagram 600 that shows certain disk I/O operations performed by the RAID controller 102 controlling a RAID-5 configuration, in accordance with certain embodiments. A host 104 requests the writing of 9 blocks of new data where each block is of block size of 512 bytes (reference numeral 602). The RAID controller 102, on receiving the request, performs (reference numeral 604) four sets of disk I/O's with selected disks of the disks 106a . . . 106n.

First, the RAID controller 102 reads 8 Kilobytes (i.e., two 4 Kilobyte blocks) of old data stored in the RAID configuration 110, wherein the two 4 Kilobyte blocks contain space that is adequate to accommodate the 9 blocks of new data where each block is of a block size of 512 bytes. This is referred to as the first set of disk I/O (reference numeral 606).

Then the RAID controller 102 reads the old parity stored in the RAID configuration 110 in multiples of 4 Kilobyte blocks. This is referred to as the second set of disk I/O (reference numeral 608). The RAID controller 102 computes new parity as needed (reference numeral 610). For example, new parity may be computed if the old data is different from the new data that is to be written. The new parity is a function of the old data, the new data, and the old parity. For example, in certain embodiments exclusive or operations may be performed to generate the new parity from the old data, the new data and the old parity.

The RAID controller 102 then writes (reference numeral 612) the 9 blocks of new data (where each block is of 512 byte size) distributed in two blocks each of 4K size as shown in FIG. 4, by performing a merger of the 9 new data blocks with 7 old unchanged data blocks and by writing the two blocks that are each of 4 Kilobyte block size. This is referred to as the third set of disk I/O. In the third set of disk I/O, the 9 blocks of new data and the 7 blocks of old data (i.e., two 4 Kilobyte blocks) are written to the disks of the RAID configuration 110.

The new parity information is also written in multiples of 4 Kilobyte blocks and this is referred to as the fourth set of disk I/O (reference numeral 614). Thus in four sets of disk I/O operations the RAID controller 102 may write the 512 byte blocks in 4K sized blocks of the RAID configuration 110, without providing any indication to the host 104 that the RAID configuration 110 does not natively support 512 byte blocks.

Therefore FIG. 6 illustrates certain embodiments in which the RAID controller 102 controls disks 106a . . . 106n that are configured as RAID-5. Reading is performed via two sets of read operations from the disks 106a . . . 106n, wherein a first set of read operations include reading the old data and a second set of read operations include reading the old parity. Writing is performed via two sets of write operations to the disks 106a . . . 106n, wherein a first set of write operations include writing the new data and portions of the old data that are not overwritten, and a second set of write operations include writing the new parity. Therefore, in RAID-5 configurations four sets of disk operations are adequate for writing 512 byte blocks to disks that are configured into 4 Kilobyte blocks.

In alternative embodiments, the RAID controller 102 controls disks 106a . . . 106n that are configured as RAID-6, wherein the old parity comprises a first set of old parity and a second set of old parity, and wherein the new parity comprises a first set of new parity and a second set of new parity. Reading is performed via three sets of read operations from the disks 106a . . . 106n, wherein a first set of read operations include reading the old data, a second set of read operations include reading the first set of old parity, and a third set of read operations include reading the second set of old parity. Writing is performed via three sets of write operations to the disks 106a . . . 106n, wherein a first set of write operations include writing the new data and portions of the old data that are not overwritten, a second set of write operations include writing the first set of new parity, and a third set of write operations include writing the second set of new parity. Therefore, in RAID-6 configurations six sets of disk operations are adequate for writing 512 byte blocks to disks that are configured into 4 Kilobyte blocks. Time may be saved because the host 104 does not have to be informed that the disks 106a . . . 106n do not support 512 byte blocks.

Figure 7:
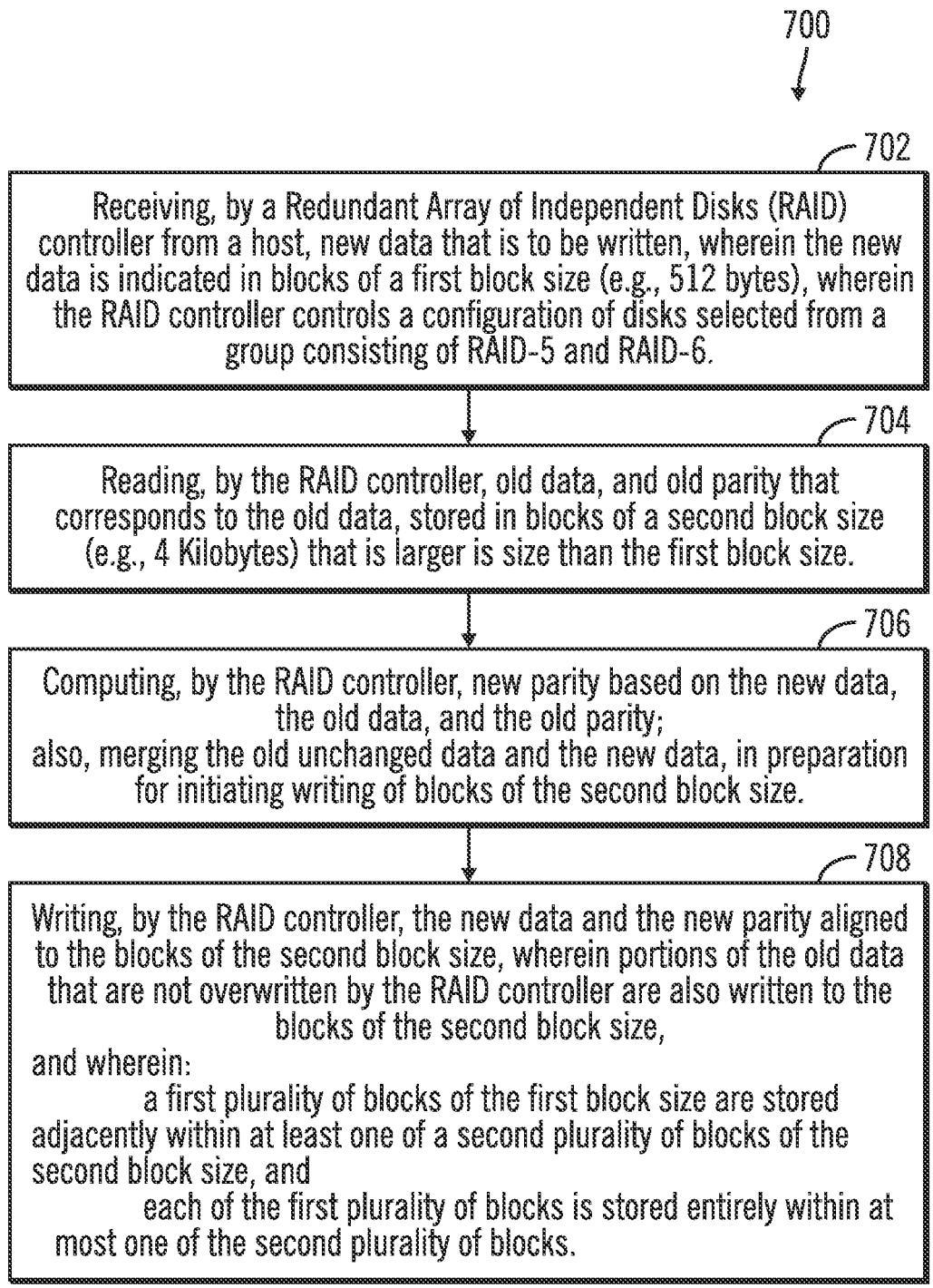
FIG. 7 illustrates a flowchart that shows certain operations, in accordance with certain embodiments.

FIG. 7 illustrates a flowchart 700 that shows certain operations, in accordance with certain embodiments The operations shown in FIG. 7 may be implemented by the RAID controller 102 via the mapping application 116.

Control starts (reference numeral 702) in which the RAID controller 102 receives new data that is to be written from a host 104, wherein the new data is indicated in blocks of a first block size (e.g., 512 bytes), wherein the RAID controller 102 controls a configuration of disks 106a . . . 106n selected from a group consisting of RAID-5 and RAID-6. Time may be saved because the host 104 does not have to be informed that the disks 106a . . . 106n do not support 512 byte blocks.

The RAID controller 102 reads the old data, and old parity that corresponds to the old data that are stored in blocks of a second block size (e.g., 4 Kilobytes) that is larger in size than the first block size (reference numeral 704). The RAID controller 102 computes (reference numeral 706) new parity based on the new data, the old data, and the old parity. Additionally, a merger may be performed of old unchanged data and the new data, in preparation for initiating writing of blocks of the second block size. Subsequently (reference numeral 708), the RAID controller 102 writes the new data and the new parity aligned to the blocks of the second block size in the disks 106a . . . 106n, wherein portions of the old data that are not overwritten by the RAID controller are also written to the blocks of the second block size, wherein a first plurality of blocks of the first block size are stored adjacently within at least one of a second plurality of blocks of the second block size, and each of the first plurality of blocks is stored entirely within at most one of the second plurality of blocks.

Therefore, FIG. 7 illustrates certain embodiments in which the RAID controller 102 maps 512 block size requests from the host 104, to a RAID configuration with a block size of 4 Kilobytes.

Figure 8:
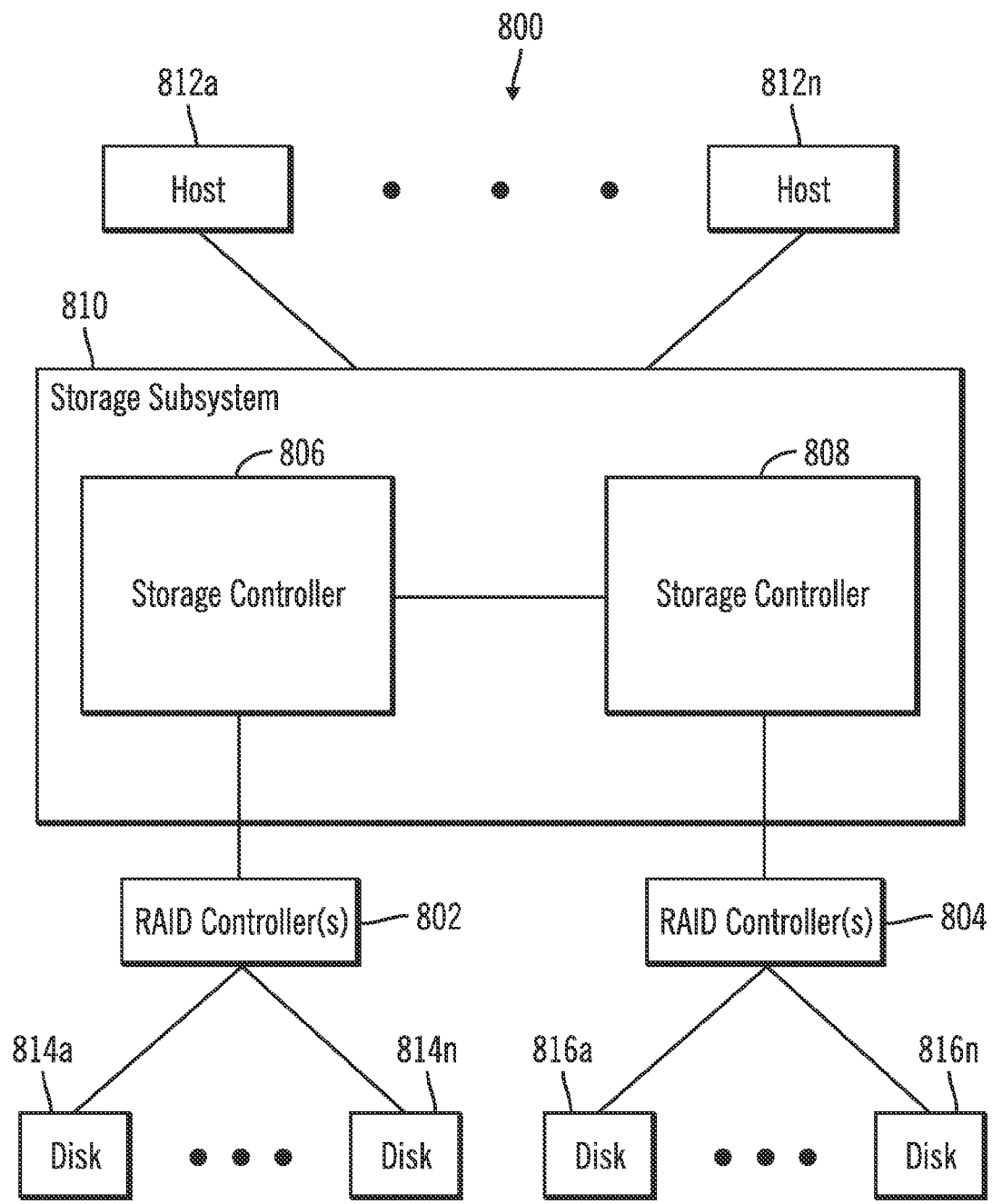
FIG. 8 illustrates a block diagram that shows RAID controllers implemented outside storage controllers, in accordance with certain embodiments.

FIG. 8 illustrates a block diagram 800 that shows RAID controller devices 802, 804 implemented outside storage controllers, in accordance with certain embodiments. The two storage controllers 806, 808 form a storage subsystem 810 that is coupled to a plurality of hosts 812a . . . 812n, wherein at least one or more of the hosts 812a . . . 812n are configured to access data in a block size of 512 bytes. The storage controller 806 is coupled to a RAID controller device 802 that is external to the storage controller 806, and the storage controller 808 is coupled to a RAID controller device 804 that is external to the storage controller 808, wherein the RAID controller devices 802 and 804 control a plurality of disks 814a . . . 814n and 816a . . . 816n respectively, wherein the plurality of disks 814a . . . 814n and 816a . . . 816n store data in 4K block size. The storage controllers 806 and 808 may substitute each other to respond to requests from any of the hosts 812a . . . 812n.

Therefore, FIG. 8 illustrates certain embodiments in which RAID controllers that are external to storage controllers within a storage subsystem map requests of 512 block size to RAID configurations that stores data and parity in a block size of 4 Kilobytes.

Figure 9:
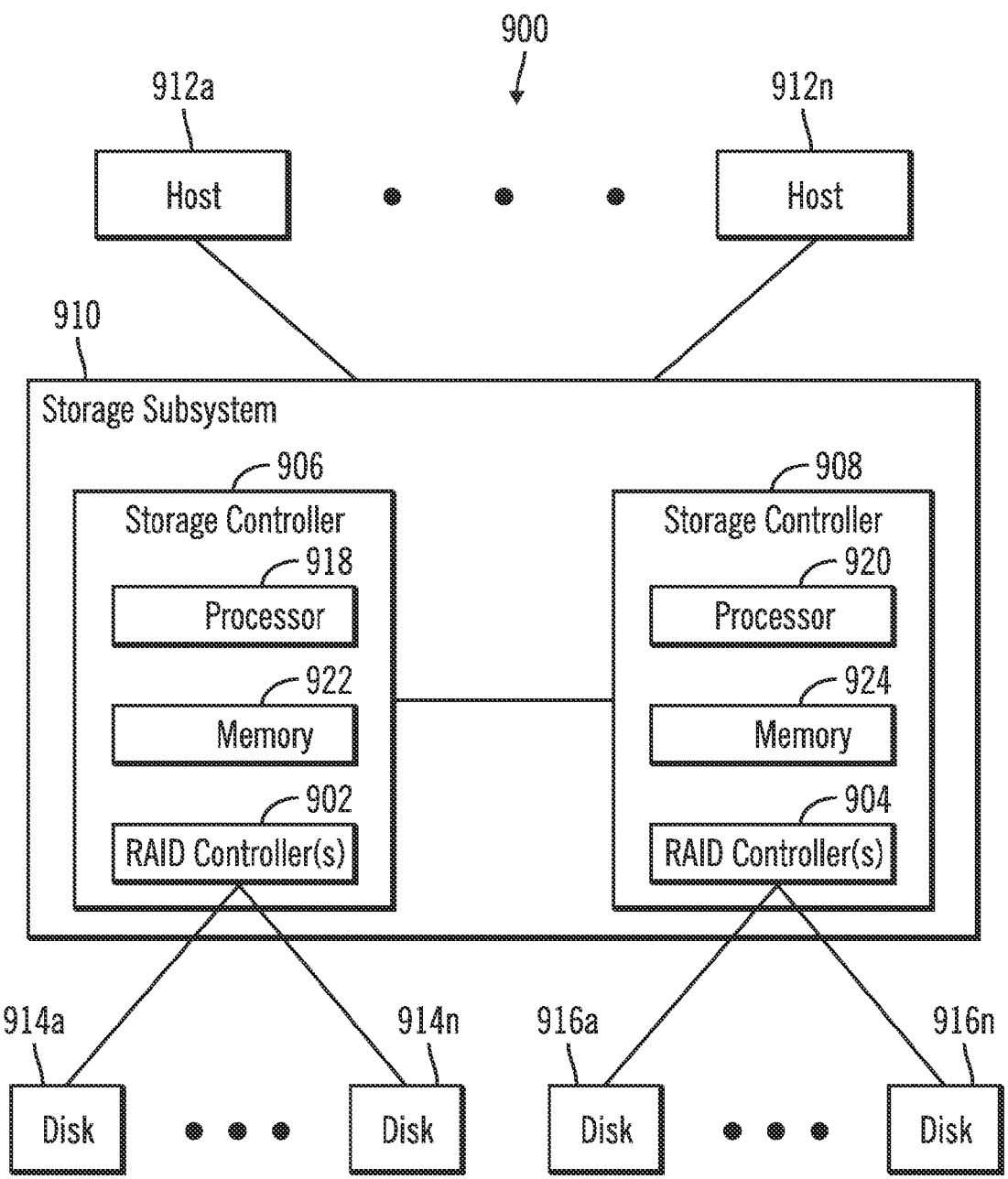
FIG. 9 illustrates a block diagram that shows RAID controllers implemented within storage controllers, in accordance with certain embodiments.

FIG. 9 illustrates a block diagram 900 that shows RAID controllers 902, 904 implemented within storage controllers 906, 908, in accordance with certain embodiments. The two storage controllers 906, 908 form a storage subsystem 910 that is coupled to a plurality of hosts 912a . . . 912n, wherein at least one or more of the hosts 912a . . . 912n are configured to access data in a block size of 512 bytes. The storage controller 906 is coupled to a RAID controller 902 that is internal to the storage controller 906, and the storage controller 908 is coupled to a RAID controller 904 that is internal to the storage controller 908 wherein the RAID controllers 902 and 904 control a plurality of disks 914a . . . 914n and 916a . . . 916n respectively, and wherein the plurality of disks 914a . . . 914n and 916a . . . 916n store data in 4K block size. The storage controllers 906 and 908 may substitute each other to respond to requests from any of the hosts 912a . . . 912n and each of then storage controllers 906, 908 include at least a processor and a memory (shown via reference numerals 918, 920 that indicate processors, and reference numerals 922, 924 that indicate memory) in addition to the RAID controllers.

Therefore, FIG. 9 illustrates certain embodiments in which RAID controllers that are internal to storage controllers within a storage subsystem map requests of 512 block size to RAID configurations that stores data and parity in a block size of 4 Kilobytes.

FIGS. 1-9 illustrate certain embodiments, in which a RAID controller maps requests made with a block size of 512 bytes to store data and parity with a block size of 4 Kilobytes in a RAID configuration that stores both data and parity.

Certain embodiments have shown mappings of 512 byte blocks to 4 Kilobyte blocks. In alternative embodiments other types of mappings may be performed. For example 512 byte, 524 byte, or 528 byte blocks on the host side may be mapped onto 4096 byte (i.e., 4 Kilobyte), 4192 byte, or 4224 byte blocks on the disk side.

It may be noted that the host does not need to know that the RAID configuration does not natively support the block size used by the host. Additionally, the RAID configuration does not need to know that the host does not natively support the block size used by the RAID configuration to store information in disks.

It may also be noted that in certain embodiments, no extra drive operations are performed in comparison to performing the same writes when the host and RAID configuration are using the same block size. Additionally, in certain embodiments the disk drives do not need to perform read, modify, and write operations internally, thereby saving processing time.

It may also be noted that in certain embodiments two RAID controllers can share the same disks. For example, in FIG. 8, RAID controllers 802 and 804 may both share disks 814a . . . 814n. In certain embodiments, just as two storage controllers can substitute each other, so can two RAID controllers.

In certain embodiments, the operations performed by the RAID controllers may be performed in a disk drive or some other device. In still further embodiments, the RAID controllers may be implemented in software, hardware, firmware or any combination thereof.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied there.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java*, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). * Java is a trademark or registered trademark of Oracle and/or its affiliates.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 10:
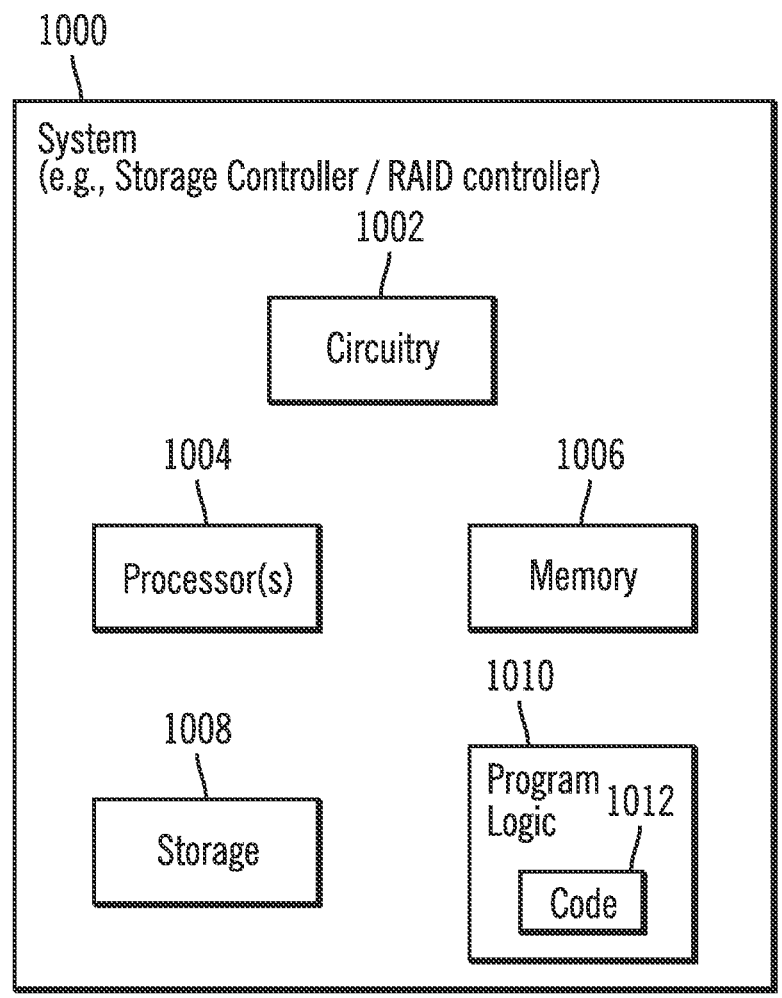
FIG. 10 illustrates a block diagram of a computational system that shows certain elements that may be included in storage controllers or RAID controllers of FIGS. 1, 8, and 9, in accordance with certain embodiments.

FIG. 10 illustrates a block diagram that shows certain elements that may be included in the storage controllers 806, 808, 906, 908 or the RAID controller 102, 802, 804, 902, 904, in accordance with certain embodiments. The system 1000 may comprise the storage controllers 806, 808, 906, 908 or the RAID controllers 102, 802, 804, 902, 904 and may include a circuitry 1002 that may in certain embodiments include at least a processor 1004. The system 1000 may also include a memory 1006 (e.g., a volatile memory device), and storage 1008. The storage 1008 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 1008 may comprise an internal storage device, an attached storage device and/or a network accessible storage device. The system 1000 may include a program logic 1010 including code 1012 that may be loaded into the memory 1006 and executed by the processor 1004 or circuitry 1002. In certain embodiments, the program logic 1010 including code 1012 may be stored in the storage 1008. In certain other embodiments, the program logic 1010 may be implemented in the circuitry 1002. Therefore, while FIG. 10 shows the program logic 1010 separately from the other elements, the program logic 1010 may be implemented in the memory 1006 and/or the circuitry 1002.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method implemented in a device, the method comprising:

maintaining a storage system comprising a first storage controller and a second storage controller coupled to a host that is configured to access data in blocks of a first block size, wherein the first and second storage controller are configurable to substitute each other in response to a request from the host, and wherein the first and the second storage controller are coupled to a plurality of Redundant Array of Independent Disks (RAID) controllers that are external to the first and the second storage controllers;

receiving, by a RAID controller of the plurality of RAID controllers from the host via the storage system, new data that is to be written, wherein the new data is indicated in blocks of the first block size;

reading, by the RAID controller, old data, and old parity that corresponds to the old data, stored in blocks of a second block size that is larger in size than the first block size;

computing, by the RAID controller, new parity based on the new data, the old data, and the old parity; and writing, by the RAID controller, the new data and the new parity aligned to the blocks of the second block size, wherein portions of the old data that are not overwritten by the RAID controller are also written to the blocks of the second block size, and wherein:

the received new data includes nine blocks of the first block size; and the nine blocks of the first block size are written into no more than two blocks of the second block size, wherein the nine blocks of the first block size are written contiguously in the no more than two blocks of the second block size, wherein the nine blocks of the first block size remain unchanged in size, and wherein the new data is stored in increments of the first block size, and wherein the plurality of RAID controllers that are external to the first and the second storage controllers map requests of the first block size to RAID configurations that store data in blocks of the second block size.

2. The method of claim 1, wherein the RAID controller is implemented in hardware, and wherein the RAID controller controls disks that are configured as RAID-5, wherein:

the reading is performed via two sets of read operations from the disks, wherein a first set of read operations include reading the old data and a second set of read operations include reading the old parity; and the writing is performed via two sets of write operations to the disks, wherein a first set of write operations include writing the new data and portions of the old data that are not overwritten, and a second set of write operations include writing the new parity.

3. The method of claim 1, wherein the RAID controller controls disks that are configured as RAID-6, wherein the old parity comprises a first set of old parity and a second set of old parity, wherein the new parity comprises a first set of new parity and a second set of new parity, and wherein:

the reading is performed via three sets of read operations from the disks, wherein a first set of read operations include reading the old data, a second set of read operations include reading the first set of old parity, and a third set of read operations include reading the second set of old parity; and the writing is performed via three sets of write operations to the disks, wherein a first set of write operations include writing the new data and portions of the old data that are not overwritten, a second set of write operations include writing the first set of new parity, and a third set of write operations include writing the second set of new parity.

4. The method of claim 1, wherein:
the first block size is 512 bytes;
the second block size is 4 Kilobytes;
the new data is received by the RAID controller from the host whose operating system is configured to access the blocks of the first block size of 512 bytes; and
the blocks of the first block size of 512 bytes store Count-key-data (CKD) records and each CKD record is aligned to a 512 byte block boundary.

5. The method of claim 4, wherein:
an additional received new data includes a first block of the first block size and a second block of the first block size; and
the first block of the first block size is written in a first block of the second block size and the second block of the first block size is written in a second block of the second block size, wherein the first block of the first block size and the second block of the first block size are written adjacent to each other in the first block of the second block size and the second block of the second block size.

6. The method of claim 5, wherein:
further additional received new data includes ten blocks of the first block size; and
the ten blocks of the first block size are written into no more than three blocks of the second block size, wherein the then blocks of the first block size are written contiguously in the no more than three blocks of the second block size.

7. The method of claim 1, wherein:
the new data comprises a first plurality of blocks of the first block size;
the first plurality of blocks of the first block size are stored adjacently within at least one of a second plurality of blocks of the second block size;
each of the first plurality of blocks is stored entirely within at most one of the second plurality of blocks.

8. The method of claim 1, wherein:
the old data is read via a first set of disk input/output (I/O) operations;
the old parity that corresponds to the old data is read via a second set of I/O operations that are performed subsequent to the first set of disk I/O operations;
the new data is written via a third set of disk I/O operations that are performed subsequent to the second set of disk I/O operations; and
the new parity aligned to the blocks of the second block size are written via a fourth set of disk I/O operations that are performed subsequent to the third set of disk I/O operations.

9. The method of claim 1, wherein the RAID controller controls disks that are configured as RAID-5 and no indication is provided to the host from which the new data is received that the disks that are configured as RAID-5 do not natively support blocks of the first block size.

10. A method for deploying computing infrastructure, comprising integrating computer-readable code into a computational system, wherein the code in combination with the computational system performs operations, the operations comprising:
maintaining a storage system comprising a first storage controller and a second storage controller coupled to a host that is configured to access data in blocks of a first block size, wherein the first and second storage controller are configurable to substitute each other in response to a request from the host, and wherein the first and the second storage controller are coupled to a plurality of Redundant Array of Independent Disks (RAID) controllers that are external to the first and the second storage controllers;
receiving, by a RAID controller of the plurality of RAID controllers from the host via the storage system, new data that is to be written, wherein the new data is indicated in blocks of the first block size;
reading, by the RAID controller, old data, and old parity that corresponds to the old data, stored in blocks of a second block size that is larger in size than the first block size;
computing, by the RAID controller, new parity based on the new data, the old data, and the old parity; and
writing, by the RAID controller, the new data and the new parity aligned to the blocks of the second block size, wherein portions of the old data that are not overwritten by the RAID controller are also written to the blocks of the second block size, and wherein:
the received new data includes nine blocks of the first block size; and
the nine blocks of the first block size are written into no more than two blocks of the second block size, wherein the nine blocks of the first block size are written contiguously in the no more than two blocks of the second block size, wherein the nine blocks of the first block size remain unchanged in size, and wherein the new data is stored in increments of the first block size, and wherein the plurality of RAID controllers that are external to the first and the second storage controllers map requests of the first block size to RAID configurations that store data in blocks of the second block size.

11. The method for deploying computing infrastructure of claim 10, wherein the RAID controller is implemented in hardware, wherein the RAID controller controls disks that are configured as RAID-5, wherein:
the reading is performed via two sets of read operations from the disks, wherein a first set of read operations include reading the old data and a second set of read operations include reading the old parity; and
the writing is performed via two sets of write operations to the disks, wherein a first set of write operations include writing the new data and portions of the old data that are not overwritten, and a second set of write operations include writing the new parity.

12. The method for deploying computing infrastructure of claim 10, wherein the RAID controller controls disks that are configured as RAID-6, wherein the old parity comprises a first set of old parity and a second set of old parity, wherein the new parity comprises a first set of new parity and a second set of new parity, and wherein:
the reading is performed via three sets of read operations from the disks, wherein a first set of read operations include reading the old data, a second set of read operations include reading the first set of old parity, and a third set of read operations include reading the second set of old parity; and
the writing is performed via three sets of write operations to the disks, wherein a first set of write operations include writing the new data and portions of the old data that are not overwritten, a second set of write operations include writing the first set of new parity, and a third set of write operations include writing the second set of new parity.

13. The method for deploying computing infrastructure of claim 10, wherein:
the first block size is 512 bytes;
the second block size is 4 Kilobytes;
the new data is received by the RAID controller from the host whose operating system is configured to access the blocks of the first block size of 512 bytes; and
the blocks of the first block size of 512 bytes store Count-key-data (CKD) records and each CKD record is aligned to a 512 byte block boundary.

14. The method for deploying computing infrastructure of claim 13, wherein:
an additional received new data includes a first block of the first block size and a second block of the first block size; and
the first block of the first block size is written in a first block of the second block size and the second block of the first block size is written in a second block of the second block size, wherein the first block of the first block size and the second block of the first block size are written adjacent to each other in the first block of the second block size and the second block of the second block size.

15. The method for deploying computing infrastructure of claim 14, wherein:
further additional received new data includes ten blocks of the first block size; and
the ten blocks of the first block size are written into no more than three blocks of the second block size, wherein the then blocks of the first block size are written contiguously in the no more than three blocks of the second block size.

16. The method for deploying computing infrastructure of claim 10, wherein:
the new data comprises a first plurality of blocks of the first block size;
the first plurality of blocks of the first block size are stored adjacently within at least one of a second plurality of blocks of the second block size;
each of the first plurality of blocks is stored entirely within at most one of the second plurality of blocks.

17. The method for deploying computing infrastructure of claim 10, wherein:
the old data is read via a first set of disk input/output (I/O) operations;
the old parity that corresponds to the old data is read via a second set of I/O operations that are performed subsequent to the first set of disk I/O operations;
the new data is written via a third set of disk I/O operations that are performed subsequent to the second set of disk I/O operations; and
the new parity aligned to the blocks of the second block size are written via a fourth set of disk I/O operations that are performed subsequent to the third set of disk I/O operations.

18. The method for deploying computing infrastructure of claim 10, wherein the RAID controller controls disks that are configured as RAID-5 and no indication is provided to the host from which the new data is received that the disks that are configured as RAID-5 do not natively support blocks of the first block size.

\* \* \* \* \*